Oct. 14, 1969   A. PREVOST   3,472,582
MOTION PICTURE CUTTING DESK PROJECTOR DEVICE
Filed March 28, 1967   2 Sheets-Sheet 1

Attilio Prevost
INVENTOR.

BY Michael S. Striker
Attorney

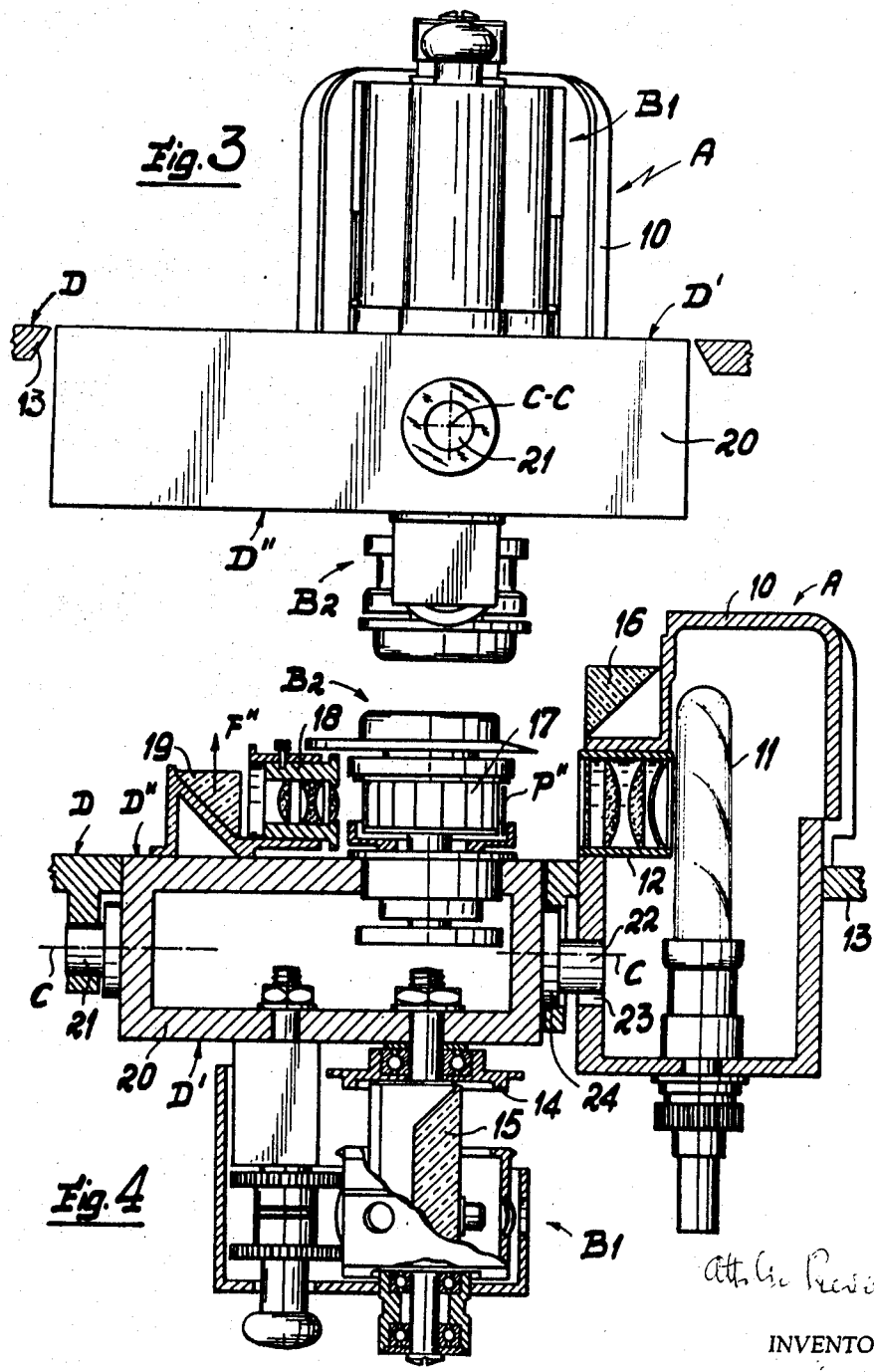

United States Patent Office 3,472,582
Patented Oct. 14, 1969

3,472,582
MOTION PICTURE CUTTING DESK PROJECTOR DEVICE
Attilio Prevost, 2 Via Desenzano, Milan, Milano, Italy
Filed Mar. 28, 1967, Ser. No. 626,476
Claims priority, application Italy, Apr. 1, 1966, 7,491/66
Int. Cl. G03b *19/18, 21/32, 3/00*
U.S. Cl. 352—133      9 Claims

ABSTRACT OF THE DISCLOSURE

A projector assembly for bench or desk designed for inspection, revision and cutting either of standard or of substandard motion picture films, including one lamp house and two projector heads individually adapted for standard and respectively substandard film, secured to a rotatable mount for selective positioning of either head in alignmnt and co-operation with the lamp, whilst the not co-operating head is located beneath the workstand upper face.

BACKGROUND OF THE INVENTION

It is known to those skilled in the art that motion picture films require a plurality of operations for preparing the actual film for projection. Said operations include careful inspection of the film, cutting or splicing and in general the so called "montage." Such operations are performed by using cutting desks ("moviolas") including projector means to project the motion picture at variable speed and even individual frames of photograms thereof on a small sized screen. Said projector means comprise at least one lamp house having a source of light and lens for condensing and parallelizing the light beam on the film frame, and at least one projector head having film positioning and progressing means, objective lens and prism means for directing the image on the screen. Cutting desks or consoles adapted for operating on standard or substandard film obviously require means specifically adapted for selectively operating on film to be cut.

According to current art, in the desks designed for inspecting and cutting either standard and substandard films, namely 35 mm. and 16 mm. films, each projector assembly comprises one lamp house supported in the desk work board both for vertical displacement and for rotation, a first projector head adapted for standard film projection and located at one side of the lamp, and a second projector head adapted for substandard film operation and located at the opposite side of same lamp. The lamp house is rotated and levelled for alignment of the light beam emitted thereby with the film frame supported for projection by the one or the other of said heads, according to the film to be worked, whilst the opposite head is off.

Such arrangement is subject to several objections. The projector heads are rather bulky and disturbing the handling of the film. Said heads are noticeably spaced apart and for directing the light beam emitted thereby on the screen one or more deflecting prisms or mirrors are required. Such provision leads to a noticeable light absorption and even to linear distortion of the image.

Cutting desks specifically designed for inspection, revision and cutting of one type of motion picture film, standard or substandard, are therefore generally preferred by professionals. It is however evident that, on the contrary, to dispose of a desk on which both standard and substandard movie picture films could be selectively operated about is desirable.

BRIEF SUMMARY OF THE INVENTION

It is a principal object of this invention to provide a motion picture film revision and cutting desk wherein, in actual work about one either standard or substandard film, one lamp house and one projector head are located on the work board, and which can be readily adapted for operating on any of said film.

In particular, it is an object of this invention to provide a projector assembly comprising one lamp house, a first projector head adapted for standard film, a second projector head adapted for substandard film, and means for selectively locating any of said heads in operative relationship with said lamp house and for concurrently recovering the off projection head beneath the work board of the desk.

According to a preferred embodiment of the invention, the said first and second projector heads are secured to a common mount structure supported for rotation about an axis parallel to and located below the upper face of the desk board and adapted for being selectively rotated between two positions wherein the said first or the said second projector head is thrown on above said face and in operative relationship with the lamp house, and the said second or the said first head is thrown off beneath said board.

According to a further object of the invention, the lamp house is supported for vertical displacement in said board for levelling the light beam emitted thereby on the film frame supported by the projector head actually thrown on, means being provided for causing said vertical displacement of the lamp house responsive to rotation imparted to the assembly including both heads and the mount therefor for throwing on and off of any of said projector heads.

A preferred embodiment of the invention will be hereinafter described with reference to the accompanying drawings, forming an essential component of this disclosure, and wherein:

BRIEF DESCRIPTION OF THE VIEWS OF THE DRAWINGS

FIGURE 3 is a side view of the same assembly, taken from the plane and in the direction indicated at III—III in FIG. 1, and FIGURE 4 is a sectional view similar to that of FIG. 1, but wherein the assembly is in its second working condition.

DETAILED DESCRIPTION

Figure 1:
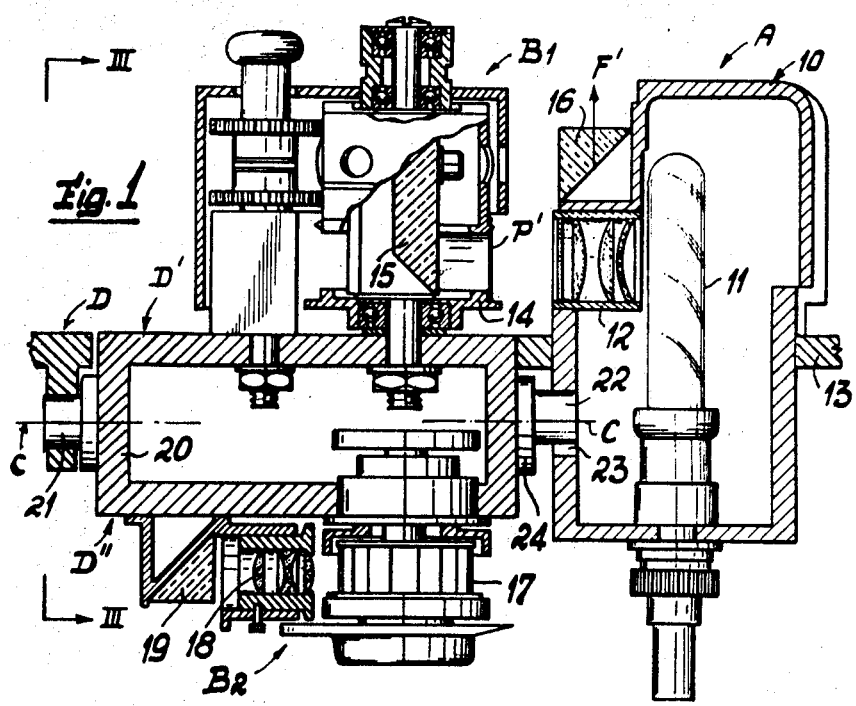
FIGURE 1 is a vertical sectional view of the assembly, taken along the plane indicated at I—I in FIGURE 2 wherein the assembly is fragmentarily shown from above.
Figure 2:
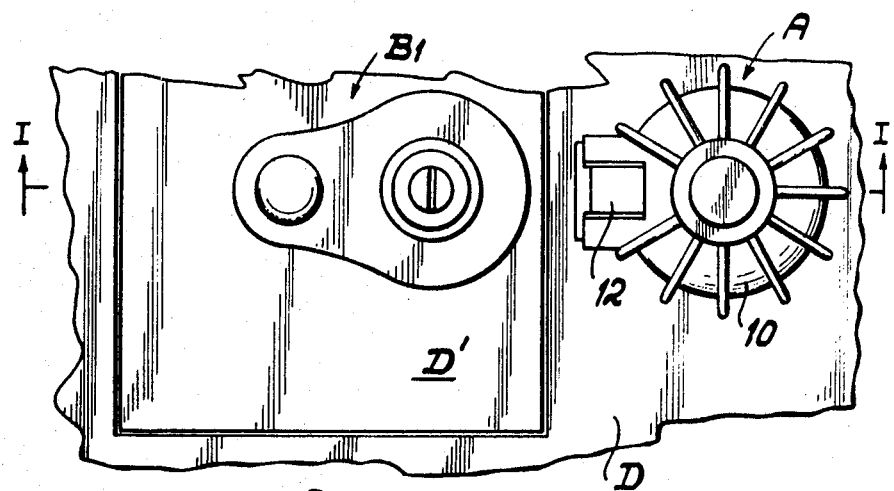

Referring now to the drawings: the device of the invention comprises a lamp house generally indicated at A, a first projector head B1 designed for progression and projection of standard films, and a second projection head B2 designed for progression and projection of substandard films. The device forms an essential component of a motion picture revision and cutting desk having a table or board (fragmentarily shown and indicated at 13) which has an upper horizontal surface D, for the work plane of the desk, as conventional in the art.

The said first and second projector head B1 and B2, and the lamp house A, when individually considered, are conventionally constructed and operable, and therefore said components will not be herein detailedly described. Each individual projector head consists of a commercially available cutting desk projection and progression means for 35 mm. and respectively for 16 mm. motion picture films. Such components will be however indicated and described as certain details therefore are concerned with the present invention, and the mode of taking advantage therefrom.

The lamp house A comprises a body 10 fitted for vertical displacement through the board 13 of the workstand. A suitable lamp 11 is supported in said body or casing 10. Condenser lens 12 are conventionally provided for condensing and parallelizing the light beam on the film photograms to be projected.

The first projector head B1 comprises a conventional sprocket means for supporting and progressing a standard film, one frame of which is indicated at P' in FIG. 1, a reflecting prism 15 and the various components (some of which diagrammatically shown) required for proper operation of the projection head. Further in accordance with current art, the prism 15 is adapted to direct the light beam into a second reflecting prism 16 supported by the casing 10 of the lamp house, which directs the beam, in the direction indicated by arrow F', towards conventionally arranged further reflecting means and the screen (not shown) wherein the image is formed.

The second projection head B2 has at its turn sprocket means 17 for supporting and progressing a substandard film, one photogram of which is indicated at P" in FIG. 4, objective lens means 18 and a reflecting prism 19 which, when the said second head is thrown on (FIG. 4) directs the light beam as indicated by arrow F" towards the said further reflecting means and screen. From a comparison of the showings of FIGS. 1 and 4, it will be readily noticed that the directions F' and F" are spaced apart by a small interval and therefore sharp and not distorted images may be provided on the desk screen from either projection heads B1 and B2.

Both said projection heads B1 and B2 are secured to one structural component consisting of a flat box-like body 20 having parallel major faces D' and D". Said body 20 is supported for rotation about an axis C—C parallel to and located below the plane defined by the surface D of the board 13 of the stand, the support of said body being ensured for example by pivot means 21 and 24 having their axis in the axis C—C. The said body 20 is so arranged that, upon rotation of 180 degrees thereof, its face D' or its face D" is located coplanarly with the upper face D of the board of the desk and actually forms a part of said face. The said first and second projection heads B1 and B2 are secured to the opposite major walls of said body 20, having said faces D' and respectively D", in the same manner and in the same relative position as said heads would be secured to the board of a conventional desk of the type considered, but provided with a stationary projection head B1 for projection of 35 mm. films or respectively with a stationary projection head B2 for projection of 16 mm. films.

It is further known to those skilled in the art to which this invention appertains that, in the arrangement of parts corresponding to current standards, the axis of the photogram P' (FIG. 1) of a standard film is located, above the upper face D of the board of the cutting desk, at a somewhat higher level than the axis of a photogram P" (FIG. 4) of a substandard film to be projected.

The vertically displaceable lamp house A is brought at the desired level in response to the rotation of body 20 by a suitable mechanical link, preferably comprising a camming means, such as an eccentric 22 secured to or integrally formed with pivot 24 of said body, and cammingly engaging with a slot 23 provided in the adjacent wall portion of casing 10 of the lamp house A, said eccentric 22 being designed for levelling the light beam axis of light beam emitted by lens 12 in the axis of photogram P' (FIG. 1) or P" (FIG. 4) of the film supported and progressed by the "ON" projection head B1 or respectively B2.

From what above and upon consideration of the accompanying drawings it will be readily evident that the invention provides a projection assembly, for a motion picture films revision and cutting desk that:

Comprises, in combination with one lamp house, a first and a second projection head adapted for selective cooperation with said one lamp house in view of projection of standard and of substandard films, and wherein each of said heads can be alternately thrown in "ON" position and in "OFF" position;

Can be prepared for projection of standard or of substandard films by simply rotating a structure comprising both said heads and a common mount therefor; and Includes, when either of said first or second projection head is at its "ON" position, the said lamp house and only one of said heads above the upper face of the desk board, whilst the "OFF" projection head is concealed beneath said face in a not disturbing location.

While the present invention has been described in considerable detail, it will be understood that it is intended to cover all constructions, modifications and arrangements which fall within the ability of those skilled in the art and within the spirit and scope of the present invention.

What is claimed is:

1. A projector device for a motion picture revision, a cutting and montaging desk having desk board comprising one lamp house including lamp and lens means to provide a condensed and parallelized light beam defining a light beam axis, a first projector head having film supporting and progressing means adapted to support and progress a standard film, and a second projector means having film supporting and progressing means to support and progress a substandard film, said first and second heads being designed for alternative cooperation with said lamp house, wherein the improvement comprises a common mount means to which both said first and second heads are secured, and supporting means for movably supporting said common mount with respect to said desk board between a first position at which said first head is held in operative relationship with said lamp house for projecting a standard film whilst said second head is not-operative and positioned beneath said desk board, and a second position at which said second head is held in operative relationship with said lamp house for projecting a substandard film while said first head is not-operative and positioned beneath said desk board.

2. An improved projector device as defined in claim 1, wherein the said common mount means is supported for rotation about an axis parallel to and located below the upper face of said desk board.

3. An improved projector device as defined in claim 2, wherein the said common mount means comprises a flat box-like body having opposite parallel major faces including a first face and a second face, is supported for rotation about one axis parallel and located between said faces so that as the assembly comprising said mount means and said first and second heads is positioned in either of said first and second position the said first or respectively the said second major face is located coplanarly of said upper face of the said desk board, and wherein the said first projector head is secured on said first face and the said second projector head is secured on said second face.

4. An improved projector device as defined in claim 1 and comprising a lamp house supported for vertical displacement in the said desk board for shifting the level of said light beam axis between a first level at which said beam is aligned with the projected photogram of a standard film supported in said first projector head and a second level at which said beam is aligned with the projected photogram of a substandard film supported in said second projector head, wherein the improvement further comprises means for vertically displacing said lamp house between said first and second level and between said second and first level in response to displacement of said first and second projector heads supporting mount between said first and second position and respectively between said second and first position thereof.

5. An improved projector device as defined in claim 4, wherein the said further means comprise camming means connected to said mount and cam engaging means connected to said lamp house.

6. An improved projector device as defined in claim 5, wherein said common mount is supported for rotation about an axis parallel to a face of said desk board, and wherein said camming means comprises an eccentric located about the axis of rotation of said mount and said cam-engaging means comprises a slot formed into a wall portion of said lamp house.

7. An improved projector device as defined in claim 1, wherein the said lamp house is secured to said desk board to define a given direction for said light beam axis, and wherein the said common mount is supported for rotation about an axis perpendicular to and intersecting said light beam axis for alternatively throwing on and off said first and second projector heads, the thrown on head supporting a photogram of a standard or respectively of a substandard film in the said light beam axis.

8. An improved projector device as defined in claim 3, wherein the said desk board is apertured for rotatably locating said box-like body within an opening formed in upper face of said desk board, and wherein the said body has first and second major faces dimensioned to essentially close said aperture when the device is set in either of its said first and second position.

9. An improved projector device as defined in claim 1, comprising reflecting prism means positioned to reflect and direct the light beam emitted by either said first or second projector head as set in its respective operative position in essentially alike directions.

References Cited

UNITED STATES PATENTS

| 1,359,457 | 11/1920 | Hansard | 352—134 |
| 3,404,938 | 10/1968 | Kubnick et al. | |

FOREIGN PATENTS 1,118,603  11/1961  Germany.

JULIA E. COINER, Primary Examiner

U.S. Cl. X.R.

352—134, 142